US008738959B2

(12) United States Patent
Harpaz et al.

(10) Patent No.: US 8,738,959 B2
(45) Date of Patent: May 27, 2014

(54) SELECTIVE MESSAGE LOSS HANDLING IN A CLUSTER OF REPLICATED SERVERS (75) Inventors: Avraham Harpaz, Haifa (IL); Nir Naaman, Haifa (IL); Idan Zach, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 13/296,250

(22) Filed: Nov. 15, 2011

(65) Prior Publication Data

US 2013/0124909 A1    May 16, 2013

(51) Int. Cl.
*G06F 11/00*    (2006.01)
(52) U.S. Cl.
USPC ............................................. 714/4.1; 714/15
(58) Field of Classification Search
USPC ............................................. 714/4.1, 15, 13
See application file for complete search history.

(56) References Cited

U.S. PATENT DOCUMENTS

| 6,023,772 | A  | * | 2/2000  | Fleming ........................ 714/13 |
| 6,687,847 | B1 | * | 2/2004  | Aguilera et al. ............... 714/4.3 |
| 6,728,781 | B1 | * | 4/2004  | Aguilera et al. ............... 709/240 |
| 7,068,974 | B1 | * | 6/2006  | Linsky et al. ................. 455/12.1 |
| 7,827,256 | B2 |   | 11/2010 | Phillips et al. |
| 8,281,184 | B1 | * | 10/2012 | Havemose ...................... 714/13 |
| 8,285,879 | B2 | * | 10/2012 | Cheifot et al. ................. 709/248 |
| 2008/0310444 | A1 |   | 12/2008 | Dekel et al. |
| 2009/0327807 | A1 | * | 12/2009 | Varadarajan et al. ........... 714/15 |

OTHER PUBLICATIONS

Chockler et al., "Group Communication Specifications: A Comprehensive Study," ACM Computing Surveys 33:4 (Dec. 2001), pp. 1-43.
Defago et al., "Total order broadcast and multicast algorithms: Taxonomy and survey". ACM Computing Surveys, vol. 36, No. 4, 2004, pp. 372-421.
Speakman et al., "PGM Reliable Transport Protocol Specification". RFC 3208, 2001.

* cited by examiner

*Primary Examiner* — Yolanda L Wilson
(74) *Attorney, Agent, or Firm* — Ziv Glazberg (57) ABSTRACT

A computer-implemented method, a computerized system and a product for providing a cluster of replicated servers. The method performed by a computerized server in a cluster of servers, wherein the cluster of servers are executing replicated instances of an application, wherein the replicated instances are configured to perform the same processing of the same input, comprising: detecting a message loss in the server; electively determining a responsive action to the message loss; and notifying the cluster of servers of the responsive action determined by the server, whereby other servers of the cluster of servers are able to mimic operation of the server by simulating the responsive action.

25 Claims, 3 Drawing Sheets

SELECTIVE MESSAGE LOSS HANDLING IN A CLUSTER OF REPLICATED SERVERS

TECHNICAL FIELD

The present disclosure relates generally to message loss handling and, more particularly to message loss handling in a cluster of replicated servers.

BACKGROUND

A cluster of computerized servers may be configured to be replicas of one another, by executing replicated instances of an application, such as a computer program, and providing the same input to the instances (i.e., input streams of all instances have the same messages and ordering thereof). A cluster of replicated servers is depicted in US Patent Publication 2008/0310444A1 entitled "Group Communication System Achieving Efficient Total Order and State Synchronization in a Multi-tier Environment", which is hereby incorporated by reference.

Replicated servers may be aimed at providing high availability of a service provided by the application. All the servers run the same application, process the same input, maintain the same state, and produce the same output. If one of the servers fails, the application remains available as long as at least one server remains functional. In some cases, servers may join the cluster during its operation, and thus after failing, a server may reboot and join the cluster. Joining the cluster may require synchronizing the state of the application to that of the cluster.

The cluster may have a server acting as a "leader". The term "leader", in the present specification, should not be construed literally. A leader server may be in charge of determining a message processing order of the cluster. Based on the determined processing order, all servers of the clusters process the messages according to the determined order. A leader may be in charge of managing the cluster, such as by providing new servers state of the application so as to enable them to join the cluster. The role of the leader may be divided to different servers, but for the sake of simplicity, and without the loss of generality, the present disclosure relates to a single leader.

A message that is transmitted to the cluster is transmitted to each server of the cluster. However, due to various reasons, such as, for example, congestion or source failure, some messages may be lost. Message loss presents a problem, as in order to be able to support transparent failover the replicated instances of the application at all the servers should maintain the same state and thus must process exactly the same set of messages and in the same order. In case one server encounters message loss from one of the sources, it cannot continue with delivering messages to the application since this may lead to an inconsistent state. In some exemplary cases, the server may attempt to recover the message or suspend itself from the cluster (and possibly attempt to regain synchronization later and rejoin the cluster). Since message loss can happen independently at each server, all the servers in the cluster may be forced to suspend themselves due to message loss from which they cannot recover. This leads to a failure of the application since the cluster is no longer able to run the application on any server.

Though reliable messaging protocols may be used to moderate the risk of message loss, such as T Speakman et al. "PGM Reliable Transport Protocol Specification", RFC 3208, (2001), which is hereby incorporated by reference, message loss may still occur. The prior art discloses a variety of mechanisms to overcome message loss problems.

One solution is a use of a Guaranteed Messaging Service (GMS), such as described in Roger Barga, David Lomet, Gerhard Weikum. Recovery Guarantees for General Multi-Tier Applications. In Proceedings of the International Conference on Data Engineering (ICDE), 2002, which is hereby incorporated by reference. The GMS provides a persistent message storage, whereby messages that were not received by a server, can be retrieved from the storage. However, GMS causes a significant overhead that slows down the entire system. Hence, such solution may not be useful in certain configurations, such as high-availability, high throughput and low latency systems.

An additional solution is a use of a Group Communication Systems (GCS). Some GCS log messages and if a server encountered message loss the messages are retrieved from one of the other servers that logged these messages. Various GCSs are disclosed in Chockler et al. "Group Communication Specifications: A Comprehensive Study," ACM Computing Surveys 33:4 (2001), which is hereby incorporated by reference. However, GCS requires overhead associated with logging messages and distributing the messages between the servers in the cluster. Hence, such solution may not be useful in certain configurations, such as high-availability, high throughput and low latency systems.

BRIEF SUMMARY

One exemplary embodiment of the disclosed subject matter is a computer-implemented method performed by a computerized server in a cluster of servers, wherein the cluster of servers are executing replicated instances of an application, wherein the replicated instances are configured to perform the same processing of the same input, comprising: detecting a message loss in the server; selectively determining a responsive action to the message loss; and notifying the cluster of servers of the responsive action determined by the server, whereby other servers of the cluster of servers are able to mimic operation of the server by simulating the responsive action.

Another exemplary embodiment of the disclosed subject matter is a computerized system comprising: a cluster of computerized servers; wherein each server of the cluster comprises a processor, a memory unit and a communication module for communicating over a computerized network; wherein each server of the cluster is adapted to execute a replicated instance of an application, wherein the servers are operative to receive the same input and perform the same processing, wherein the servers are substantial replicas of one another; wherein a server of the cluster comprising a processor operative to: detect a message loss in the server; selectively determine a responsive action to the message loss; and notify the cluster of servers of the responsive action determined by the server, whereby other servers of the cluster of servers are able to mimic operation of the server by simulating the responsive action.

Yet another exemplary embodiment of the disclosed subject matter is a computer program product comprising: a non-transitory computer readable medium having stored thereon a set of instructions to be performed by a computerized server in a cluster of servers, wherein the cluster of servers are executing replicated instances of an application, wherein the replicated instances are configured to perform the same processing of the same input; wherein said set of instructions comprises: a first program instruction for detecting a message loss in the server; a second program instruction for selectively determining a responsive action to the message loss; and a third program for notifying the cluster of servers of responsive action determined by the server, whereby other servers of the cluster of servers are able to mimic operation of the server by simulating the responsive action.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to provide a message loss mechanism for clusters of replicated servers. The message loss mechanism may be configured to enable selective treatment of losses of different types of messages and in different situations.

Another technical problem is to enable the selective determination to be based on the application logic and may be different with different applications.

One technical solution is to determine a responsive action to the message loss by the leader. The responsive action may be to suspend the leader from the cluster and allow a different server that received the lost messages, to become the leader and process the lost messages. Alternatively, the responsive action may be to drop the lost messages from being processed by the cluster. In some exemplary embodiments, the responsive action may determine certain types of messages to be dropped in the future, such as messages from the same source as the lost messages, messages pertaining to the same topic thereof, messages having the same priority, or the like.

Another technical solution is to determine message loss information useful for determining the responsive action and provide the information to the application for determining Hence, the application logic may be able to provide tailored decisions in accordance with the application's requirements. The application may, for example, implement an Application Programming Interface (API) for receiving the information and providing the determined responsive action. The information may be determined based on data associated with other received messages which are useful for deducing information regarding the lost messages themselves. The information may be a number of lost messages, estimated age, priority thereof, content of next available message, transport information relating to the lost messages, or the like.

In order for some message loss information to be determined, the source sending the message can add information to messages useful for indicating properties of messages that were lost. Hence, a server that did not receive some messages may extract information from other messages that were received and using thereof determine properties of the lost messages.

One technical effect of utilizing the disclosed subject matter is enabling application logic to determine which messages can be dropped without affecting availability of the cluster. Thereby, the application logic may be invoked in the decision of how to handle message loss in the cluster, and the decision is not performed by a transport layer or similar layer of a communication system.

Another technical effect is to enable reduced overhead associated with message loss handling, as some messages are allowed to be dropped without recovery attempts.

Yet another technical effect is providing a flexible solution which can be useful for applications that are executed under high throughput messaging, require low latency messaging, provide high availability service, or the like. In particular, the disclosed subject matter may be useful for applications that require high throughput and low latency messaging combined with high availability and consistency services. In some exemplary embodiments, high throughput low latency message delivery may be supported as consistency can be maintained without being forced to persist or log messages.

Yet another technical effect is that the disclosed subject matter allows combination of relatively unreliable sources of messages, without necessitating message recovery with each message lost from the unreliable sources. Furthermore, message lost from the unreliable sources does not dictate suspension of the server from the cluster, and may be handled differently than message loss from a different source.

Yet another technical effect is that different actions may be taken for different message losses that are detected. This may provide greater flexibility in handling message loss event.

The disclosed subject matter can be combined with any of the other message loss handling mechanism (e.g. guaranteed messaging, message logging, or the like) but it may also be used by itself to remove the overhead associated with the message loss handling mechanism.

Figure 1A:
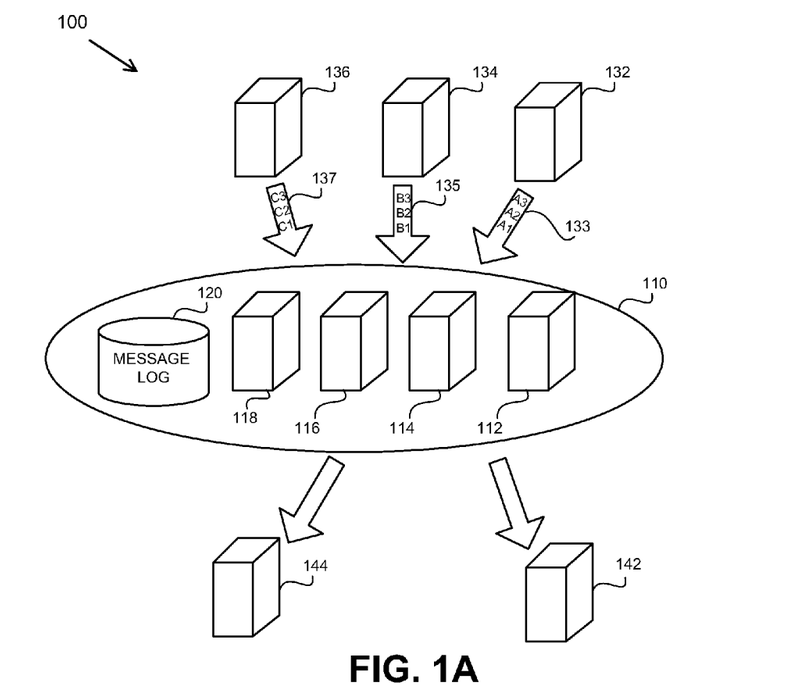
FIGS. 1A and 1B show diagrams of a computerized environment, in accordance with some exemplary embodiments of the disclosed subject matter.

Referring now to FIG. 1A showing a diagram of a computerized environment, in accordance with some exemplary embodiments of the disclosed subject matter. A computerized environment 100 comprises a cluster 110. Cluster 110 comprises a plurality of servers (e.g., 112, 114, 116, 118) executing replicated instances of an application. Cluster 110 may comprise any number of servers, and the number of servers may change dynamically by new servers joining cluster 110, by servers suspending from cluster 110 in response to losing synchronization, or the like.

Replicated servers can be useful for providing high availability of a service. Hence, if a first server cannot provide the processed data to a destination (e.g., due to a communication problem, due to server malfunction or rebooting, or the like), a different server may provide the same output as the first server to the destination. In view of the above, the servers are sometimes referred as "backup servers". As long as at least one server remains function Cluster 110 is able to provide the service of the application.

A server, such as server 112, may be deemed a leader. In some exemplary embodiments, in response to a leader suspending itself, a different server may take the role of the leader instead of the suspended leader. In some exemplary embodiments, all servers of cluster 110 are capable of acting as leaders. In some exemplary embodiments, a portion of the servers of cluster 110 is not capable of acting as leaders and can only perform a role of backup servers.

One or more Message Sources (132, 134, 136) may provide to cluster 110 one or more message streams (133, 135, 137, respectfully). It will be noted that a single source may provide cluster 110 with any number of message streams, and is not limited to a single message stream per source. Message sources 132, 134, 136 may broadcast message streams 133, 135, 137 to all servers of cluster 110. In some exemplary embodiments, a reliable multicast may be utilized as a communication protocol to provide the messages to all servers of cluster 110. Other communication protocols may be utilized to broadcast the data. It will be understood that the disclosed subject matter is applicable to environments having any number of data sources, including, but not limited to a single data source.

As can be appreciated, message stream 133 of source 132 dictates an ordering of its messages (A1, A2, A3). Similarly, message stream 135 of Source 134 dictates an ordering of its messages (B1, B2, B3). However, a message processing order by cluster 110 should be determined In some exemplary embodiments, the message processing order, also referred to as total order, can maintain the partial orders dictated by the message streams. In case that a single source is available, the total order may be the order of the message stream. However, in some embodiments, the total order may be different than the message stream order even in such an environment, or may not include all messages of the message stream.

In some exemplary embodiments, a first source (e.g., 132) may be more reliable than a second source (e.g., 134) and may be expected to fail delivery less often. For example, reliability may differ due to physical location or network connectivity (e.g., source 134 is a wireless source which may be mobile, while source 132 is immobile and connected using a direct wire to all servers of cluster 110), due to hardware differences (e.g., source 134 is a home computer, while source 132 is a dedicated server), or the like.

In some exemplary embodiments, cluster 110 provides a financial service, such as stock exchange operations, bank operations, or the like. Different sources may be associated with different clients, such as for example, a large financial corporation as opposed to a private investor. Therefore, sources associated with one client may be less reliable, from a communication standpoint, than those associated with another client.

In some exemplary embodiments, a source, such as source 132, may encode message loss information as metadata of the messages, thereby enabling a server, such as server 112, to determine information associated with lost messages that were not received by server 112.

Cluster 110 may provide output to destinations (e.g., 142, 144). The environment may have any number of destinations, including but not limited to, one destination, or hundreds of destinations. Destinations 142, 144 may be computerized devices capable of receiving data from cluster 110, such as via a communication protocol. Destination 142 may receive data from a single server of cluster 110 or from multiple servers of cluster 110. Destination 142 may be indifferent of which server transmits the data to it, as the servers of the cluster 110 provide the same data.

It will be understood that computerized devices that communicate with one another are connected over some form of computerized network, such as Local Area Network (LAN), Wide Area Network (WAN), WiFi network, WiMAX network, Ethernet network, intranet, Internet, and the like.

In some exemplary embodiments, a message log 120 may be utilized to log messages received by cluster 110. Message log 120 may be, for example, data storage, a Network Associated Storage (NAS), a Storage Area Network (SAN), or a similar storage device, preferably, persistent storage device. Message log 120 may be utilized to store messages received by cluster 110 and recover messages by one or more servers of cluster 110 that did not receive the messages. Additionally or alternatively, message recovery by servers of cluster 110 may be performed by requesting the lost messages from other servers of cluster 110.

Figure 1B:
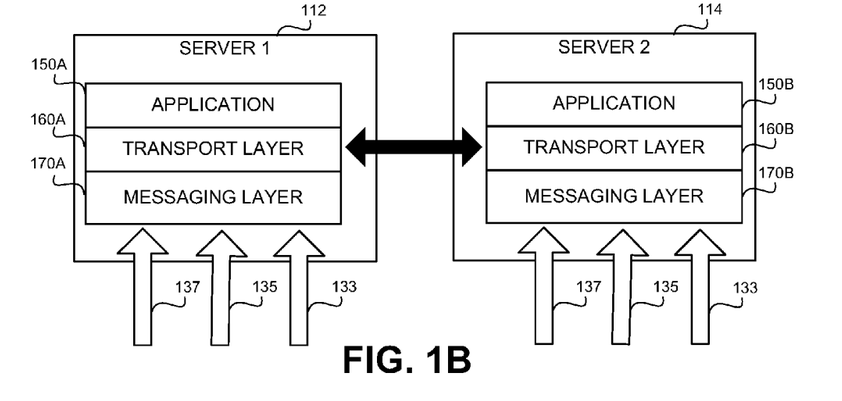

Referring now to FIG. 1B showing an embodiment of server 112 and server 114 of cluster 110, in accordance with some embodiments of the disclosed subject matter.

Server 112 comprises of different components, each having different purpose.

A messaging layer 170A may be configured to receive messages from the sources (e.g., message streams 133, 135, 137) and send messages to the destinations. In some exemplary embodiments, reliable multicast may be utilized by messaging layer 170A

A transport layer 160A may be configured to manage cluster 110. Transport layer 160A may be configured to ensure consistent service of cluster 110. Transport layer 160A may perform tasks such as leader election, failure detection, server introduction into the cluster, and the like. Transport layer 160A may be configured to set and enforce the total order of the messages. In some exemplary embodiments, transport layer 160A provides messages, in accordance with the total order, to an application 150A. In some exemplary embodiments, transport layer 160A is configured to selectively drop certain messages, such as based on determination of the leader, determination of the application in the leader, or the like.

The application 150A is an application providing the service of cluster 110. The application 150A may be, for example, an application for performing trading operations in a stock market, such as registering bid and ask orders in an order book. Other exemplary applications may include applications for online shopping (e.g., multiple servers are executing requests from multiple customers and need to maintain the same state), online gaming servers (e.g., multiple users perform actions on the server and the server is replicated for high-availability), or the like. In some exemplary embodiments, application 150A can be any application that needs to be highly available. The disclosed subject matter is relevant even to applications where total order is not important.

Similarly, server 114 comprises a messaging layer 170b, a transport layer 160b and an application 150B.

Without loss of generality, server 112 may be deemed as the leader of cluster 110. Upon message loss detection, transport layer 160a may provide application 150a with message loss information. Based on the message loss information, application 150a may determine a responsive action to the message loss. If, for example, the responsive action is suspending server 112 from cluster 110, transport layer 160a may implement the responsive action, such as by initiating a leader election process in cluster 110 to replace server 112. In some exemplary embodiments, a leader may simply stop functioning as the leader, and a leader election process may initiate based on a determination by servers in cluster 110 that there is no leader available. Alternatively, if the responsive action is dropping the lost messages, transport layer 160a may notify all servers, including server 114, that the lost messages are to be dropped. Transport layer 160B may receive the notification and, in case the lost messages were received by messaging layer 170B, drop the messages. Transport layer 160B may provide application 150B with messages, but not the lost messages, even if they were received by messaging layer 170B. Additionally or alternatively, transport layer 160a may determine a total order of the messages, which does not include the lost message. The total order may be transmitted to transport layer 160B, which provides application 150B with messages in accordance with the total order. Thereby, transport layer 160b is notified to ignore and drop the lost messages.

Figure 2:
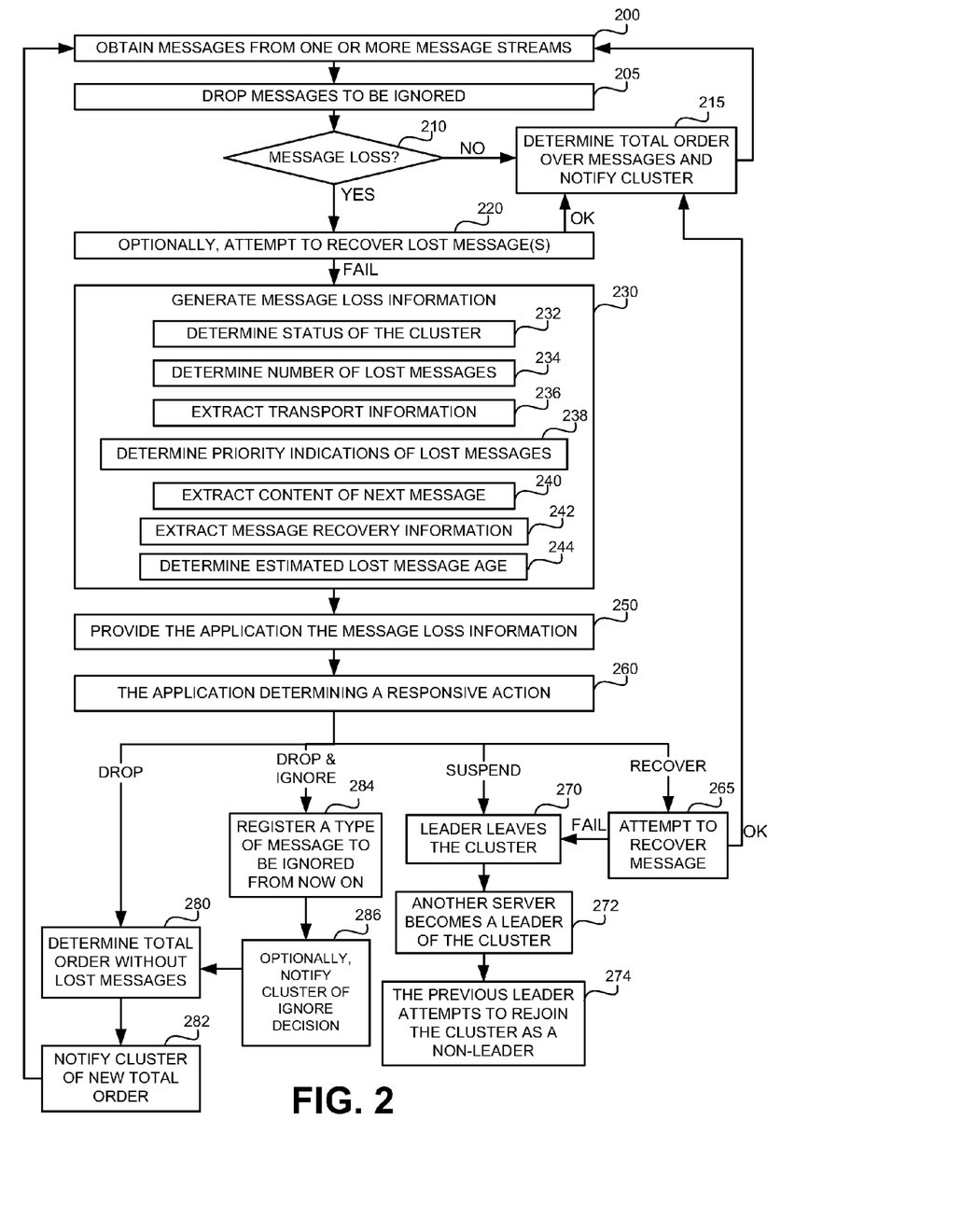
FIG. 2 shows a flowchart diagram of steps in a method for message loss handling, in accordance with some exemplary embodiments of the disclosed subject matter.

Referring now to FIG. 2 showing a flowchart diagram of steps in a method for message handling, in accordance with some exemplary embodiments of the disclosed subject matter. The method of FIG. 2 may be performed by a leader, or by a server configured to determine which messages are to be processed and which messages are to be dropped.

It will be noted that in some exemplary embodiments, total order may be determined by a different server than the one performing the method of FIG. 2. Optionally, the server performing method of FIG. 2 is able to modify the total order determined by the different server and notify the cluster of the modification. Alternatively, order of processing the messages need not be maintained and may be modified as long as the same set of messages are processed by each server of the cluster. However, without the loss of generality, and with the purpose of ease of explanation, the present disclosure describes an embodiment in which the server performing FIG. 2 determines the total order by itself and does not receive the total order from an external source.

In step 200, messages are obtained from message streams (e.g., 133 of FIG. 1A).

In step 205, in case any of the received messages match an ignore criteria, those messages are ignored and dropped from processing. In some exemplary embodiments, dropping a message means that the message is not forwarded to the application (e.g., application 150A) for processing. The ignore criteria may be set in step 284, which is described hereinbelow.

In step 210, message loss is determined Message loss may be detected in any technique known in the art. In one embodiment, messages have sequential identifiers. If a previous message was received with a certain identifier, next message to be received from the same stream is expected to have a next identifier after the certain identifier. For example, assuming the sequence numbers increased by one, after receiving message #45; next message should be #46. If any other message is received, e.g., #58, message loss may be detected. Furthermore, based on the identifier of the received message, a number of lost messages may be determined (see step 234 hereinbelow). In the above example, twelve (12) messages are lost.

In case no message loss is detected, step 215 may be performed to determine a total order of received messages. The total order may be transmitted to the cluster to enable each backup server to implement the total order. Afterwards, step 200 may be performed to receive additional messages. It will be further understood that based on the total order messages are provided to the application in each server, including the server performing the method of FIG. 2.

In case message loss is detected, step 220 may be performed. Optionally, message recovery is attempted using any message recovery mechanism. If recovery succeeded, step 215 may be performed, while if not all messages are recovered, step 230 may be performed. It will be noted that step 220 enables a non-selective recovery of lost messages. However, some embodiments allow for selective recovery of messages. In particular, an embodiment that includes step 265 disclosed hereinbelow allows for a selective recovery of lost message based on application logic.

In step 230, message loss information may be generated. Message loss information may be provided to the application in step 250, thereby enabling the application logic to determine responsive action to the message loss based on relevant information.

Message loss information may comprise status of the cluster (232), number of lost messages (234), transport information (236), priority indication of lost messages (238), content of next available message (240), message recovery information (242), estimated age of lost messages (244), any combination thereof, or the like.

In step 232, status of the cluster may be determined Status of the cluster may be an indication of how many servers compose the cluster. In some exemplary embodiments, when the leader is the only active server in the cluster, suspension of the leader would mean that the whole cluster would stop functioning, and thereby a different behavior may be determined.

In step 234, number of lost messages may be determined Number of lost messages may be computed based on identifiers of messages received and determination of the gap in-between. Different behavior may be performed when a large number of messages are lost than that is performed when only one message is lost.

In step 236, transport information may be extracted. Transport information comprises information relating to the communication protocol. The information may include the source of the messages, the message stream, the topic, or the like. The information may comprise lower level information (e.g., attributed to the physical layer, data link layer, or network layer) such as message rate, number of packets received, number of Negative-ACKnowledges (NACKs) sent, and the like. In some exemplary embodiments, the information may be useful, for example, as the application may allow loss on some topics but not on other topics. Similarly, different message streams and sources may be handled differently. Additionally, lower level information may be useful, for example, for comprehending whether recovery is feasible, whether it is likely that transmission of message to other servers was successful, or the like.

In step 238, priority indication of lost messages may be determined Priority indications may be determined by requesting information from the cluster, thereby the other servers of the cluster, which may have received the lost messages or other type of data that was not received by the server performing step 238, may provide the priority indications. Additionally or alternatively, and in order to avoid overhead of issuing a query to the cluster, the priority indication may be determined by the server using information associated with messages that were received. For example, each message may comprise metadata including an ordinal distance from last message having a predetermined priority. Thereby, using the metadata of messages before and after gap of missing messages, and taking into account the priority of the messages preceding the gap, it may be determined whether any of the lost messages are of the predetermined priority. An exemplary embodiment is described hereinbelow with respect to Tables 1 and 2.

At the sender side (source), a priority is assigned to each message based on its content or other considerations. The priority may be either high priority (denoted as 0) or low priority (denoted as 1). Additional information may be added as metadata to the message: (1) message sequence number (e.g. sequential unique identifiers); (2) priority of the message; and (3) distance in number of messages, also referred to as ordinal distance, from a last high priority message. In some exemplary embodiments, a predetermined value, such as −1, undef, or the like, may be utilized if no high priority messages were previously sent.

For simplicity, we denote sequence number of message M as SQN(M), priority of message M as P(M) and distance of message M as D(M).

Table 1 shows metadata as transmitted from source, where −1 represents that no high priority was previously sent.

TABLE 1

| | SQN(M): | | | | | | | | | |
|---|---|---|---|---|---|---|---|---|---|---|
| | 1 | 2 | 3 | 4 | 5 | 6 | 7 | 8 | 9 | 10 |
| P(M): | 1 | 1 | 0 | 1 | 0 | 0 | 0 | 1 | 1 | 0 |
| D(M): | −1 | −1 | −1 | 1 | 2 | 1 | 1 | 1 | 2 | 3 |

At the leader, a message gap may be detected by detecting that message Y is received immediately after message X, but SQN(X)+1<SQN(Y). The number of messages lost can be computed by calculating: SQN(Y)−(SQN(X)+1).

A determination of whether the one or more lost messages comprise at least one high priority message may be performed as follows: if D(Y) indicates that no high priority messages were previously transmitted, then the lost messages are not of high priority. Otherwise, SQN(Y)−D(Y) indicates a sequence number of the last high priority message that was sent before Y. If the sequence number is greater than SQN(X) the meaning is that at least one high priority message was lost. Pseudo code for performing the above described computation may be:

IF (D(Y)==−1) OR (SQN(Y)−D(Y)<=SQN(X))

THEN only messages of low priority have been lost

ELSE at least one message of high priority has been lost

It will be noted that the additional information is relatively small and consists of a distance that may be encoded using an integer (e.g., 2 bytes, 4 bytes, or the like).

The disclosed subject matter may handle a plurality of priorities. The distance may be with respect to a predetermined priority and may indicate whether any of the lost messages are of a priority level that is at least the predetermined priority.

Additionally or alternatively, a plurality of distances may be utilized with respect to different Priorities. Consider a messaging system with three priorities: high, medium and low. Two ordinal distances may be utilized in order to indicate ordinal distance from the last high priority and medium priority messages. Table 2 shows metadata as transmitted from source, high, medium and low priorities are indicates by 0, 1, and 2 respectfully, and where D0 and D1 indicate distance from last high or medium priority message.

TABLE 2

| | SQN(M): | | | | | | | | | |
|---|---|---|---|---|---|---|---|---|---|---|
| | 1 | 2 | 3 | 4 | 5 | 6 | 7 | 8 | 9 | 10 |
| P(M): | 1 | 2 | 0 | 1 | 2 | 0 | 0 | 2 | 1 | 0 |
| D0(M): | −1 | −1 | −1 | 1 | 2 | 3 | 1 | 1 | 2 | 3 |
| D1(M): | −1 | 1 | 2 | 3 | 1 | 2 | 3 | 4 | 5 | 1 |

Using the corresponding ordinal distance metadata, it can be determined whether a message of priority p was not received by the receiver.

IF (Dp(Y)==−1) OR (SQN(Y)−Dp(Y)<=SQN(X))

THEN no messages of priority p have been lost

ELSE at least one message of priority p has been lost

Hence, using additional metadata, which may be associated with additional overhead, more precise priority indications may be determined In step 240, content of next message after the one or more lost messages may be extracted. In some exemplary embodiments, the application may utilize the content in determination whether or not the content of the lost messages is deemed important. For example, in some embodiments, a message may contain "rollback" instructions to undo operations by previous messages. If this is the case, a lost message that was rollbacked later on may be dropped. In some exemplary embodiments, step 240 may extract content from a plurality of messages and not a single message.

In step 242, message recovery information may be extracted. Message recovery information may be, for example, whether or not the messages can be retrieved from storage, estimated retrieval time, or the like. The application may take the message recovery information into account when determining the responsive action.

In step 244, estimated age of lost messages may be determined. In some exemplary embodiments, messages may become stale after a certain amount of time, and may be ignored after a time period elapsed since the message creation. In such cases, lost messages that are stale may be dropped. Messages may include additional information to enable determination of estimated age of lost messages. The additional information may comprise a message creation time stamp. Additionally or alternatively, the additional information may comprise a time difference from when some of the previously sent messages were created. For example, message number X may include the time difference from when messages X-1, X-10, X-100, and X-1000 were created. Additionally or alternatively, the additional information may comprise sequence numbers of messages that were created at various time differences from this message. For example, a message created at time T may include the sequence numbers of the messages that were created at times T-10 ms, T-100 ms, T-1 sec, and T-10 sec. Based on the additional information of a received message, age of lost messages may be determined or estimated. In some exemplary embodiments, the application can use the time age encoded in the first message that is available after the loss to determine whether the missing messages are (likely to be) stale or not. Based on the information the application may select to take an appropriate responsive action. For example, it may determine to ignore stale lost messages.

In step 250, message loss information generated in step 230 may be provided to the application, or to any other component operable to select a responsive action based on the message loss information.

In step 260, the application (or other component in charge of responsive action selection) may determine a responsive action to the message loss. In some exemplary embodiments, possible responsive actions may be, for example, suspend the server from the cluster, attempt to recover lost data, instruct the cluster to drop the lost messages, or the like. Additionally or alternatively, based on the message loss information, a determination to ignore future messages may be determined. For example, based on a determination that a source and the cluster are not in sync after a lost message was dropped by the cluster, next messages from the source may be dropped. In some exemplary embodiments, messages may be dropped until a sync operation is performed so as to get the cluster and the source back in sync. As another example, based on a determination that messages are often lost from a certain message stream, the message stream may be ignored in the future. As yet another example, in case a message of a certain topic is ignored, messages of the same topic or of related topics may be ignored hereon.

In some exemplary embodiments, a responsive action may comprise a sequence of alternative actions, such as first try to recover the message and if unsuccessful suspend the server. As another example, the sequence may be: first try to recover and if unsuccessful ignore the message. Any sequence combining alternative or additional In FIG. 2 four different responsive actions are exemplified: suspend, recover, drop and ignore. As can be appreciated, the method of FIG. 2 describes two sequences of responsive actions (e.g., recover and alternatively suspend; and drop and additionally ignore).

In response to a RECOVER responsive action, message recovery may be attempted (265). Message recovery may be performed similarly to that performed in step 220. In some exemplary embodiments, if step 220 is performed, in step 265 a recovery attempt that requires additional overhead than that of step 220 may be performed. If recovery succeeds, there is no longer a message loss and step 215 may be performed. Alternatively, if recovery fails, an alternative responsive action may be performed, such as, for example, SUSPEND (step 270). In some exemplary embodiments, in response to failure to recover the application may determine the alternative responsive action. In some exemplary embodiments, step 260 may be performed to determine the alternative responsive action. In some exemplary embodiments, the application may take into account messages that were recovered, their content, priorities or the like. Furthermore, the application may take into account the reason for which the recovery has failed.

In step 270, in response to a SUSPEND responsive action determination, the leader server performing the method of FIG. 2 may suspend itself from the cluster. In step 272, a different server may become a leader of the cluster, based on some leader election procedure. Leader election may initiate after the leader explicitly notifies the cluster that it suspends itself. Additionally or alternatively, leader election may initiate after the cluster is implicitly notified of the suspension, such as when the leader seizes to provide instructions to the cluster for a predetermined timeframe. In some exemplary embodiments, the leader that was suspended from the cluster may attempt to rejoin the cluster as a backup server (274).

In step 280, in response to a DROP responsive action determination, the leader may determine a total order for the cluster that does not comprise the lost messages. In step 282, the cluster may be notified of the new total order, hence causing the dropped message not to be processed by any backup server and effectively dropped. Notification in step 282 may be said to be an implicit notification of the DROP responsive action. In some exemplary embodiments, an explicit notification of the DROP responsive action may be provided to the cluster, thereby each backup server may, in response, drop the lost messages. After the DROP responsive action is performed, new messages may be obtained and new message losses may be handled.

In step 284, in response to an IGNORE responsive action determination, the leader may register a type of message to be ignored. In some exemplary embodiments, messages from the message stream on which the message loss occurred may be ignored. Ignoring messages can be permanent, for a predetermined time duration, for a predetermined number of messages, or the like. Optionally, the IGNORE responsive action determination may be provided to that cluster (286), hence providing an explicit notification. The backup servers may then ignore the determined type of message on their own. Alternatively, the IGNORE responsive action determination may be provided in an implicit notification, by the leader server ignoring target messages and omitting them from the total order that the leader may provide to the cluster (e.g., in step 215).

In some exemplary embodiments, an IGNORE responsive action may be determined together with an additional responsive action such as RECOVER or DROP. In FIG. 2 an example of IGNORE & DROP is described wherein in addition to steps 284 and 286, steps 280, 282 are performed as is described hereinabove.

It will be noted that the method of FIG. 2 may be performed by a server, such as a leader server of the cluster. In some exemplary embodiments, a backup server may follow instructions by the leader. In some exemplary embodiments, a backup server processes received messages only after receiving permission from the leader to do so (e.g., in the form of a total order comprising identifiers of the received messages). If a message loss responsive action is received from another server (e.g., leader), the responsive action may be implemented by the backup server. For example, the backup server may drop a message, even in case that it was received. As another example, the backup server may register types of messages to be ignored.

In some exemplary embodiments, the backup server may report the message loss event to the application being executed in the backup server. Additionally or alternatively, the application may be informed about the responsive action that was received from the leader.

In some exemplary embodiments, in case a backup server detects message loss of a message that the server did not instruct to ignore (e.g., a message comprised by the total order), the backup server may suspend itself from the cluster and optionally attempt to rejoin the cluster later on. In some exemplary embodiments, the backup server may first attempt to recover such lost message, and only in the event it cannot recover the message, suspend itself.

Figure 3:
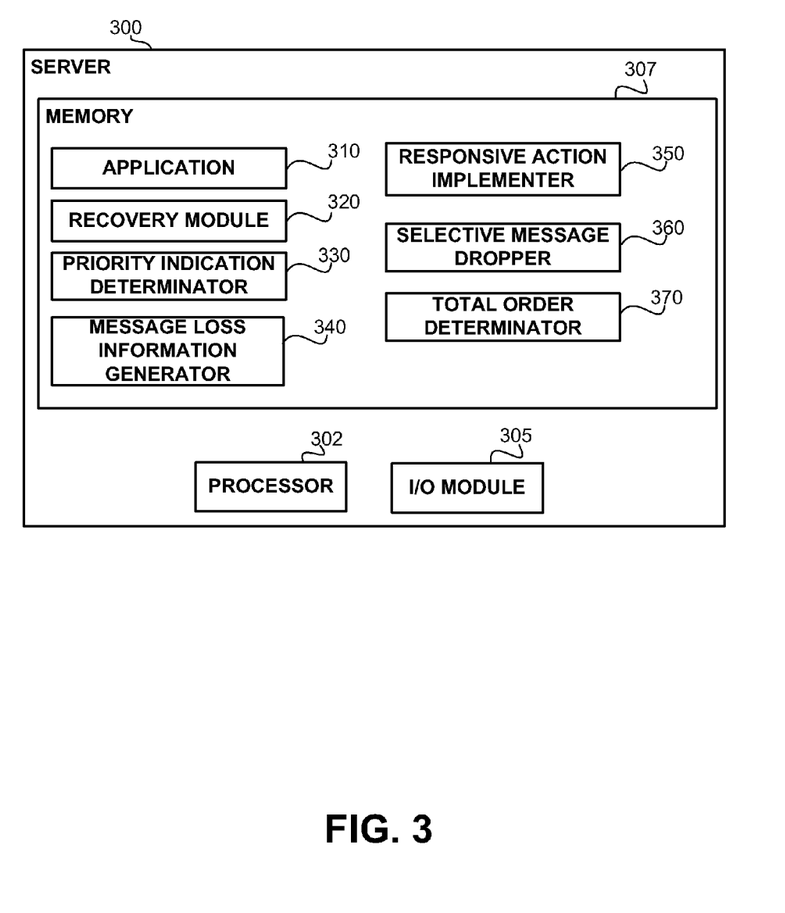
FIG. 3 shows a block diagram of components of a computerized server, in accordance with some exemplary embodiments of the disclosed subject matter.

Referring now to FIG. 3 showing a block diagram of components of a server, in accordance with some exemplary embodiments of the disclosed subject matter. A Server 300 may be a server of a cluster, such as Cluster 110. In some exemplary embodiments, Server 300 is a server capable of being a leader of the cluster. Server 300 may be configured to either act as a backup server or as a leader.

Server 300 may be a computerized apparatus adapted to perform a method such as depicted in FIG. 2.

In some exemplary embodiments, Server 300 may comprise a Processor 302. Processor 302 may be a Central Processing Unit (CPU), a microprocessor, an electronic circuit, an Integrated Circuit (IC) or the like. Alternatively, Server 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 302 may be utilized to perform computations required by Server 300 or any of it subcomponents.

In some exemplary embodiments of the disclosed subject matter, Server 300 may comprise an Input/Output (I/O) Device 305 such as a receiver, transmitter, transceiver, modem, an input device, an output device or the like. In some exemplary embodiments, I/O Device 305 is utilized to connect to an I/O device for providing input by or output to a human user. It will however be appreciated that the system can operate without human operation.

In some exemplary embodiments, Server 300 may comprise a Memory 307. Memory 307 may be computerized memory, such as persistent or volatile. For example, Memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory 307 may retain program code operative to cause Processor 302 to perform acts associated with any of the steps shown in FIG. 2. In some exemplary embodiments, Memory 307 may retain the received messages, registered types of messages to ignore, or the like.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

Application 310 may be an application operated by the cluster, such as 150A of FIG. 1B. Application 310 may adhere to a predetermined API enabling Application 310 to receive message loss information and determine responsive action. Furthermore, the API may provide an interface for determining current state of Application 310 and changing current state of Application 310, thereby enabling different instances of Application 310 to be executed at a backup server be synchronized to the state of Application 310 of Server 300 without processing (by the backup server) all the messages that were processed by Application 310.

A Recovery Module 320 may be configured to recover a message that was not received by Server 300. Recovery module 320 may recover messages from a message log (e.g., 120 of FIG. 1A), from another server of the cluster, or the like.

A Priority Indication Determinator 330 may be configured to determine priority indications regarding one or more lost messages. Priority indication determinator 330 may determine the priority indication based on messages received before and after the lost messages gap. Priority indication determinator 330 may perform step 238 of FIG. 2.

A Message Loss Information Generator 340 may be configured to generate message loss information, such as described with respect to steps 230-244 of FIG. 2. Generator 340 may be configured to generate message loss information. Generator 340 may be configured to utilize Priority Indication Determinator 320. Generator 340 may provide the message loss information to Application 310. Application 310 may comprise a responsive action selection logic (not shown) to determine the responsive action based on the message loss information.

A Responsive Action Implementer 350 may be configured to implement the responsive action received from Application 310. Additionally or alternatively, Responsive Action Implementer 350 may be configured to implement a responsive action received from an external source, such as a different server that acts as a leader. Implementing the responsive action may be performed similarly to as described with respect to steps 260-286 of FIG. 2.

A Selective Message Dropper 360 may be configured to selectively drop received messages. Selective Message Dropper 360 may drop a message based on a registration indicating the message is to be ignored (e.g., as is performed in step 205 of FIG. 2), Additionally or alternatively, Selective Message Dropper 360 may drop a message based on a determination that the total order indicates the message is to be dropped. If, for example, a first and second messages are received from the same message stream, where the first message was received before the second message. Selective Message Dropper 360 may determine that the total order indicates the first message be dropped if the total order indicates processing the second message before it indicates processing the first message. As the order between the first and second messages is dictated by the message stream, processing the second message indicates that the first message was dropped by the leader and excluded from the total order altogether.

A Total Order Determinator 370 may determine a total order for a cluster. The total order may be transmitted to the backup servers of the cluster, which may follow the order dictated by the total order. Total Order Determinator 370 may perform operations such as described with respect to step 215 of FIG. 2.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized server in a cluster of servers, wherein the cluster of servers are executing replicated instances of an application, wherein the replicated instances are configured to perform the same processing of the same input, comprising:
    detecting a message loss in the server;
    selectively determining a responsive action to the message loss; and
    notifying the cluster of servers of the responsive action determined by the server, whereby other servers of the cluster of servers are able to mimic operation of the server by simulating the responsive action.

2. The computer-implemented method of claim 1, wherein the message loss comprises failure to receive one or more messages by the server; and wherein at least one of the other servers of the cluster of servers received the one or more messages.

3. The computer-implemented method of claim 1, further comprising selectively or non-selectively attempting to recover one or more lost messages; wherein non-selective recovery is performed in response to said detecting; and wherein selective recovery is performed based on a responsive action.

4. The computer-implemented method of claim 1, wherein the responsive action comprises dropping one or more lost messages from being processed by the application, whereby in response to said notifying, the cluster of servers are able to avoid processing the one or more lost messages.

5. The computer-implemented method of claim 4, wherein said selectively determining the responsive action further comprises determining a message type to be ignored, wherein in response to receiving new messages of the message type, the server does not provide the new messages to application for processing.

6. The computer-implemented method of claim 1, wherein:
    said selectively determining comprises selecting whether or not to stop the application being executed by the server;
    in response to a determination not to stop the application, determining the responsive action to the message loss.

7. The computer-implemented method of claim 1, wherein said determining the responsive action is performed by the application.

8. The computer-implemented method of claim 7, wherein said determining the responsive action comprises: providing the application with a state of the cluster; and wherein the application determining the responsive action based on the state of the cluster.

9. The computer-implemented method of claim 8, wherein the state of the cluster comprises a number of servers that are executing the replicated application.

10. The computer-implemented method of claim 7, wherein said determining the responsive action comprises: providing the application with information selected from the group consisting of:
- number of lost messages;
- estimated age of lost messages;
- content of next available one or more messages; and
- transport information relating to one or more lost messages.

11. The computer-implemented method of claim 7, wherein said determining the responsive action comprises: providing the application with an indication relating to priority of one or more lost messages, wherein the indication is determined based on two or more messages, wherein the two or more messages comprise at least one message preceding the one or more lost messages and at least one message succeeding the one or more lost messages.

12. The computer-implemented method of claim 11, further comprising determining the indication relating to priority by:
- extracting from a succeeding message a first ordinal distance since last message having a priority;
- extracting from a preceding message a second ordinal distance since last message having the priority; and
- determining whether one or more of the lost messages having the priority based on the difference between the first ordinal distance and the second ordinal distance.

13. The computer-implemented method of claim 1, wherein said detecting, said selectively determining, and said notifying are performed a plurality of times, wherein at least two different responsive actions are determined with respect to different message losses.

14. The computer-implemented method of claim 13,
- wherein in response to detecting message loss of a first message having a first priority, determining to drop the first message;
- wherein in response to detecting message loss of a second message having a second priority, determining not to drop the second message; and
- wherein the first priority is lower than the second priority.

15. The computer-implemented method of claim 1, wherein the notification to the cluster is either an implicit or explicit notification.

16. The computer-implemented method of claim 1, wherein said selectively determining is based on metadata information comprised by messages that were received, wherein the metadata information of a message is useful for determining a property associated with one or more of lost messages.

17. A computerized system comprising:
a cluster of computerized servers;
wherein each server of the cluster comprises a processor, a memory unit and a communication module for communicating over a computerized network;
wherein each server of the cluster is adapted to execute a replicated instance of an application, wherein the servers are operative to receive the same input and perform the same processing, wherein the servers are substantial replicas of one another;
wherein a server of the cluster comprising a processor operative to:
- detect a message loss in the server;
- selectively determine a responsive action to the message loss; and
- notify the cluster of servers of the responsive action determined by the server, whereby other servers of the cluster of servers are able to mimic operation of the server by simulating the responsive action.

18. The computerized system of claim 17, wherein message loss is detected upon inability of the server to receive a message, notwithstanding other servers receiving or failing to receive the message.

19. The computerized system of claim 17, wherein the responsive action comprises dropping one or more lost messages from being processed by the application, whereby in response to the notification, the cluster of servers are able to avoid processing the one or more lost messages.

20. The computerized system of claim 17, wherein the processor is further configured to execute the application, and wherein the application is operative to perform the selectively determine the responsive action to the message loss.

21. The computerized system of claim 20, wherein the processor is further operative to determine a state of the cluster; and wherein the application is operative to determine the responsive action based on the state of the cluster.

22. The computerized system of claim 20, wherein the processor is further operative to determine an indication of priority of one or more lost messages, wherein the indication is determined based on two or more messages, wherein the two or more messages comprise at least one message preceding the one or more lost messages and at least one message succeeding the one or more lost messages.

23. The computerized system of claim 20, wherein the application is operative to determine to drop a message having a relatively low priority and not to drop a message having a relatively high priority.

24. The computerized system of claim 17, wherein the cluster is configured to receive messages from a plurality of sources, wherein the plurality of sources comprise sources having different reliability, wherein the server is adapted to perform different message recovery procedures with respect to message loss from sources having different reliability.

25. A computer program product comprising:
a non-transitory computer readable medium having stored thereon a set of instructions to be performed by a computerized server in a cluster of servers, wherein the cluster of servers are executing replicated instances of an application, wherein the replicated instances are configured to perform the same processing of the same input;
wherein said set of instructions comprises:
a first program instruction for detecting a message loss in the server;
a second program instruction for selectively determining a responsive action to the message loss; and
a third program for notifying the cluster of servers of responsive action determined by the server, whereby other servers of the cluster of servers are able to mimic operation of the server by simulating the responsive action.

* * * * *